United States Patent [19]

Bessinger

[11] Patent Number: 5,791,054

[45] Date of Patent: Aug. 11, 1998

[54] ROTARY CUTTERS

[75] Inventor: Henry John Bessinger, Newdigate, United Kingdom

[73] Assignee: Easytrim Ltd., Surrey, United Kingdom

[21] Appl. No.: 759,171

[22] Filed: Dec. 3, 1996

Related U.S. Application Data

[63] Continuation-in-part of Ser. No. 360,388, Dec. 21, 1994, abandoned, which is a continuation-in-part of Ser. No. 155,690, Nov. 22, 1993, abandoned.

[30] Foreign Application Priority Data

Nov. 24, 1992 [GB] United Kingdom .................. 9224631
Oct. 8, 1993 [GB] United Kingdom .................. 9320736
May 25, 1994 [GB] United Kingdom .................. 9410427

[51] Int. Cl.$^6$ ........................................ A01D 34/73
[52] U.S. Cl. ........................ 30/276; 30/347; 56/12.7
[58] Field of Search .................. D8/8; 30/276, 30/347; 56/295, 12.7

[56] References Cited

U.S. PATENT DOCUMENTS

| | | |
|---|---|---|
| 2,888,993 | 6/1959 | Dunning . |
| 4,054,992 | 10/1977 | Ballas et al. . |
| 4,065,913 | 1/1978 | Fischer et al. . |
| 4,086,700 | 5/1978 | Inada . |
| 4,126,991 | 11/1978 | Gobin et al. . |
| 4,171,724 | 10/1979 | Steele . |
| 4,199,926 | 4/1980 | Petty . |
| 4,382,356 | 5/1983 | Ballas, Sr. et al. . |
| 4,406,065 | 9/1983 | Kohler . |
| 4,513,563 | 4/1985 | Roser et al. . |
| 4,571,831 | 2/1986 | White, III ........................ 30/276 |
| 4,825,627 | 5/1989 | Truderung ........................ 30/276 |
| 4,869,055 | 9/1989 | Mickelson . |

FOREIGN PATENT DOCUMENTS 2231484  12/1974  France .

*Primary Examiner*—Kenneth E. Peterson
*Attorney, Agent, or Firm*—Emrich & Dithmar

[57] ABSTRACT

A rotary cutter head assembly comprises a cutting element including a substantially spherical enlarged retaining portion, a filamentary flexible elongate cutting portion, and a substantially cylindrical intermediate strengthening portion, which is integral with and between the retaining portion and the filamentary portion and is of smaller cross-sectional area than that of the retaining portion, and a head including a first flange which is substantially planar, a second flange which is substantially planar and which extends substantially parallel to and is spaced from the first flange so as to define a channel between the first and second flanges, in which channel the retaining portion of the cutting element is releasably and pivotally retain. The first flange has an aperture therethrough having a first aperture portion which is sized such that the enlarged retaining portion of the cutting element is able to pass therethrough, and a second aperture portion which is sized such that the enlarged retaining portion is unable to pass therethrough and such that the strengthening and cutting portions are able to pass therethrough. The second flange has a similar aperture therethrough, including aperture portions similar to and opposite those in the first flange. The first and second flanges are spaced apart by a dimension which is smaller than the diameter of the retaining portion whereby the retaining portion extends into the first aperture portions in the flanges to retain the retaining portion within the channel.

13 Claims, 6 Drawing Sheets

ROTARY CUTTERS

REFERENCE TO RELATED APPLICATION

This is a continuation-in-part of U.S. Pat. application Ser. No. 08/360,388 filed Dec. 21, 1994, now abandoned, which itself is a continuation-in-part of application Ser. No. 08/155,690, filed Nov. 22, 1993, now abandoned.

FIELD OF THE INVENTION

The present invention relates to rotary cutters and is applicable in particular to rotary cutters known as filament trimmers for cutting vegetation.

BACKGROUND TO THE INVENTION AND PRIOR ART

Rotary cutters for vegetation are well known. Many such cutters utilize rigid metal blades. For lighter work, flexible elongate filaments have been used. For example U.S. Pat. No. 4,065,913 (Fisher et al) discloses a cutter head assembly employing cutting elements in the form of plastic pins, each provided with a head. The pin extends through a hole in the cutter head, and is retained by a head of the pin. However, once fitted, the pin is not prevented from becoming dislodged and falling back through the hole. Also, the hole holds the pin securely in the region of the head, without permitting any pivotal movement. Consequently, when the pin strikes an immovable object, it flexes to avoid the object. The flexibility required for this may not be an advantage when cutting vegetation, and continued flexing will shorten the life of the pins.

U.S. Pat. No. 4,406,065 discloses a rotary cuter employing cutting elements in the form of rigid blades which are pivotally connected to the head. Each blade has a cylindrical pivot pin which is retained in a bearing seat 6. Such rigid blades can fall back into the head when the rotary cutter is not in use, for example when being transported from one site to another. The blades are therefore likely to jam inside the head when the cutter is started up.

An object of the present invention is to provide a rotary cutter head assembly which enables simple and rapid fitting on removal of cutting elements.

Another object of the present invention is to provide a rotary cutter head assembly wherein a cutting element projects, in use, between first and second flanges, and wherein the cutting element is fitted by insertion through an aperture in one of the flanges.

A further object of the present invention is to provide a cutting element which is adequately centered between the flanges regardless of the thickness of the cutting portion of the cutting element.

These and other objects of the invention will be apparent from the following description, which is given by way of example.

STATEMENT OF INVENTION

According to a first aspect of the invention there is provided a rotary cutter head assembly comprising a cutter head for rotation about a first axis, and a cutting element which is carried by the cutter head for pivoting movement relative to the cutter head about a second axis which is parallel to and spaced from the first axis, the cutter head comprising first and second flanges which are spaced apart from each other to define a peripheral channel, the first and second flanges being provided with retaining means for the cutting element, and the cutting element comprising a spherical retaining portion having a first diameter which is larger than the spacing between the flanges, which retaining portion is engaged between the flanges by the retaining means, a cylindrical centering portion having a second diameter which is smaller than the first diameter, and a filamentary flexible elongate cutting portion which has a cross-section smaller than that of the centering portion, the retaining means of the first flange comprising an aperture which is sized to permit the passage therethrough of the spherical retaining portion, the aperture having an elongate extension having a width which is smaller than the first diameter and larger than the second diameter, whereby the cutting element is connectable to the head by passing the cutting portion through the aperture to emerge from the channel, allowing the centering portion to pass into the channel through the elongate extension of the aperture, and allowing the spherical retaining portion to pass through the aperture into the channel, there to be retained by the aperture and by the retaining means of the second flange, the centering portion cooperating with the flanges to hold the spherical retaining portion in engagement with the aperture and with the retaining means on the second flange.

According to a second aspect of the invention there is provided a cutting element for a rotary cutter, the cutting element comprising:

a spherical retaining portion at a first end of the cutting element, the retaining portion having a first diameter;

a cylindrical centering portion extending from the retaining portion and having a second diameter which is smaller than the first diameter; and a filamentary flexible elongate cutting portion which extends from the centering portion to a second end of the cutting element, the cutting portion having a cross-section which is smaller than that of the centering portion.

I have discovered that, whilst it is important that the cutting element has a certain freedom to rotate, thus to minimise bending, the most important area in which pivoting should be enhanced is that which, in use, is in a substantially horizontal plane. Allowing for bending in the plane at right angles thereto is not as significant with regard to breakage. Allowing a significant angle of pivoting in the horizontal plane provides significant reduction in breakage compared previous the examples of trimmer.

DETAILED DESCRIPTION OF PREFERRED EMBODIMENTS

Figure 1:
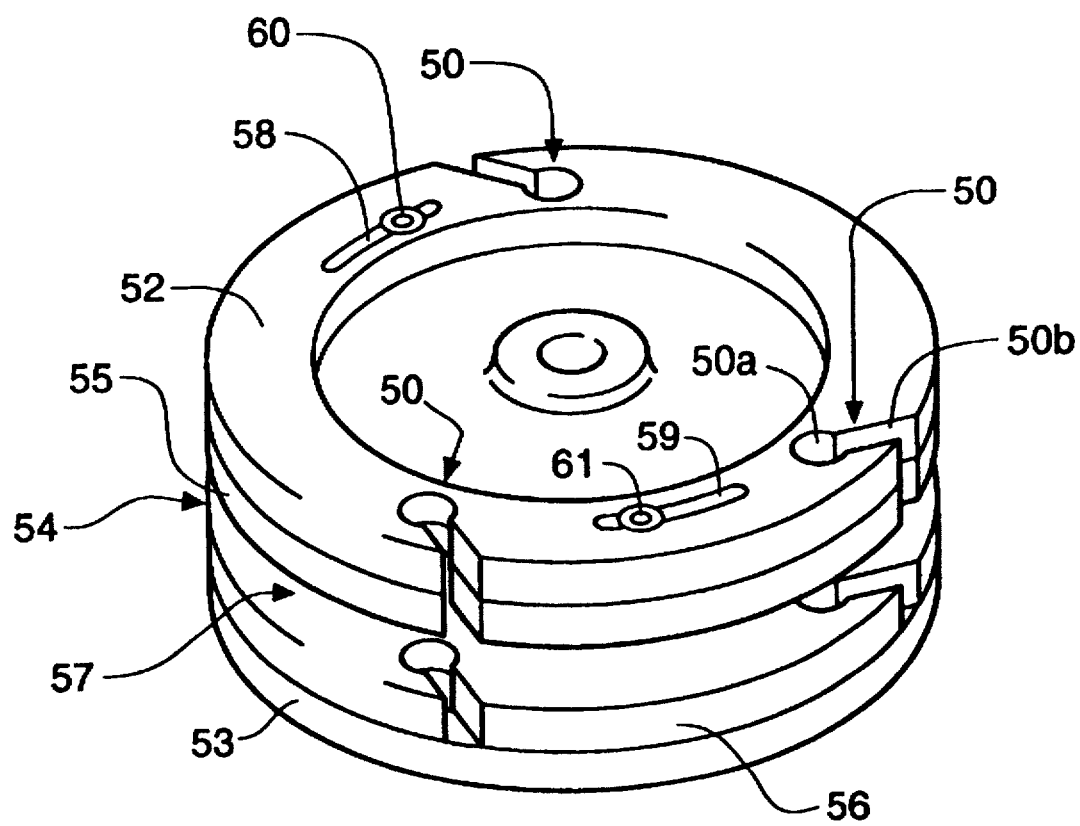
FIG. 1 is a perspective view of a rotatable head for a rotary cutter according to a first embodiment of the present invention.
Figure 2:
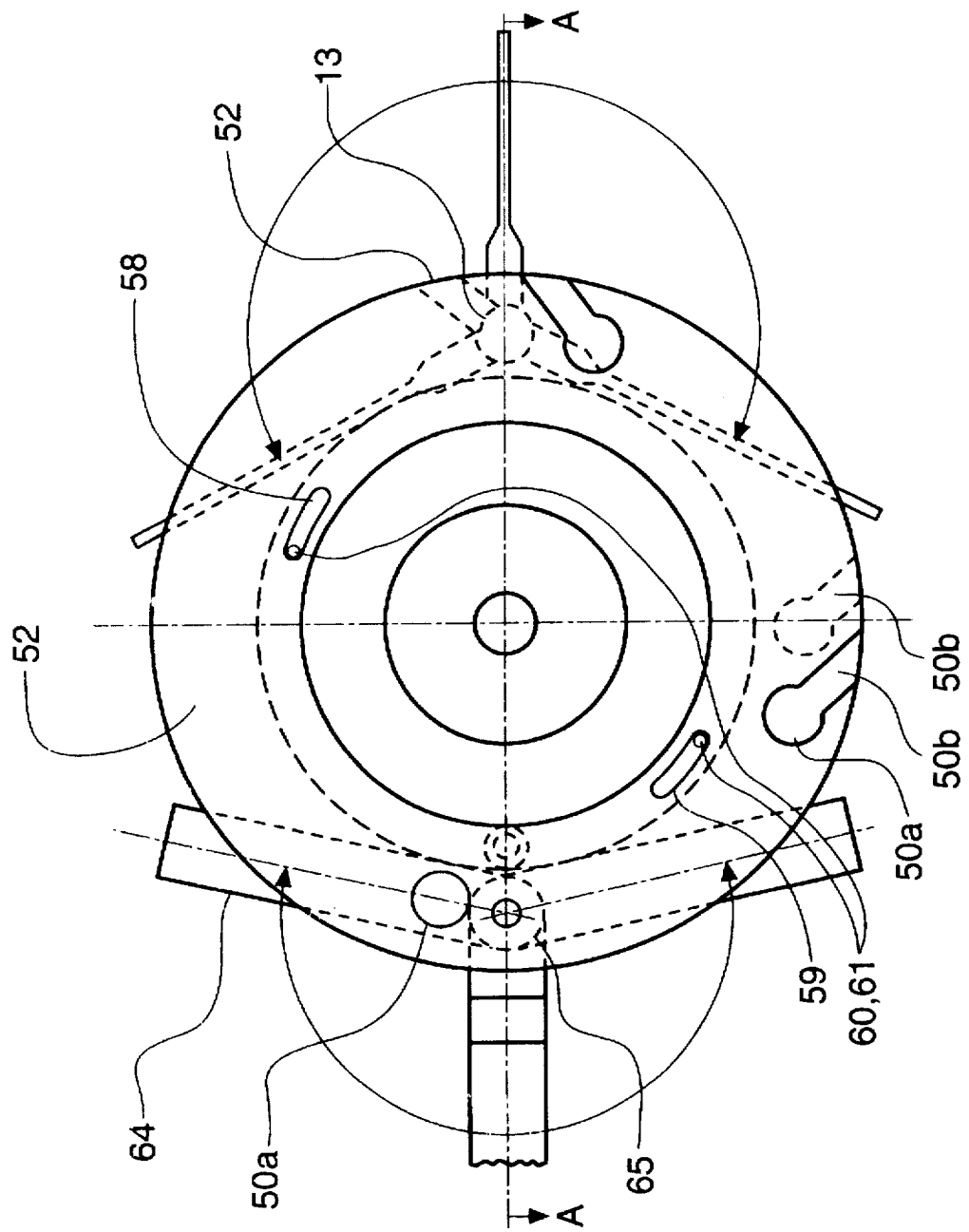
FIG. 2 is a plan view of FIG. 1 and which also shows on its left-hand side a modification thereof.
Figure 3:
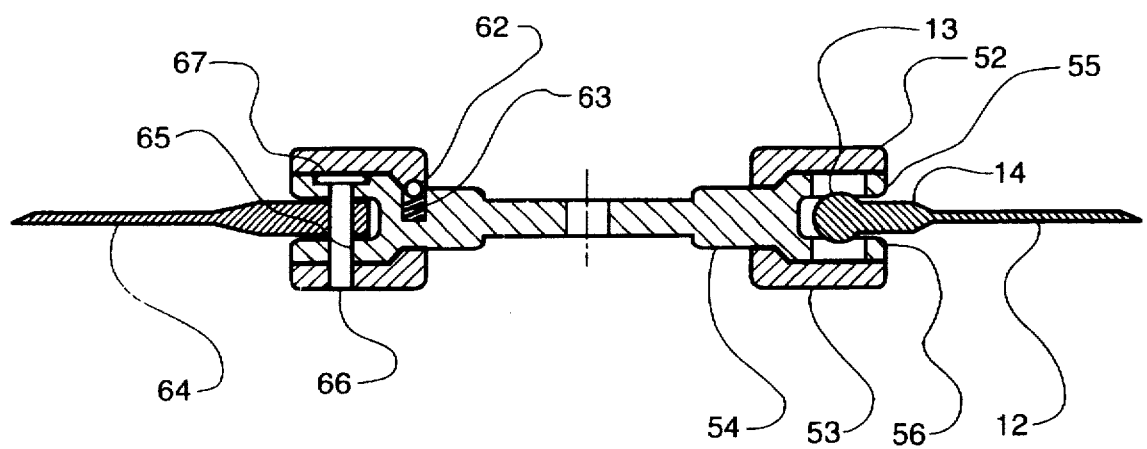
FIG. 3 is a cross-section on the line A—A of FIG. 2.

FIG. 1, the right-hand sides of FIGS. 2 and 3 and the bottom portion of FIG. 2, show a rotatable head embodying the present invention and designed for attachment to an existing trimmer. It is especially designed for use with replaceable cutting elements of the kind shown in the right-hand side of FIG. 2. Such a cutting element comprises an enlarged, spherical, retaining portion 13 (FIG. 2), an elongate filamentary cutting portion 12 and an intermediate enlarged centering portion 14 formed integrally between the portions 12 and 13.

This form of cutting element is designed to be inserted into the rotatable head of FIGS. 1 to 3 with a vertical component of motion, as considered in the normal orientation of use, via apertures 50 in the head. In the example shown in FIG. 1, the head has three such apertures 50, so that the head can simultaneously carry up to three cutting elements. Any number of apertures can be provided in the head, although preferably two, three or four apertures are used. Each aperture 50 is in a form generally corresponding to that of the cutting element, i.e. it comprises a circular aperture portion 50a having an elongate extension 50b through which the centering portion 14 of the cutting element can pass.

Considering now the specific construction of this example of head, it is made up of three main parts, two end plates 52 and 53 and an intermediate flange arrangement comprising a generally cylindrical member 54, having a circumferentially extending channel or slot 57 defining opposed flange or wall portions 55 and 56 of the member 54. The channel 57 has a radial depth sufficient for it to extend to a position which is radially inwards of each circular aperture 50a. The apertures 50 extend through the end plate 52 and both flanges 55 and 56, and in this example do not extend through the bottom plate 56.

The upper plate 52 is rotatably mounted to the upper surface of the member 54 and is rotatably guided thereon by two arcuate slots 58 and 59 engaged by bolts 60 and 61 screw-threaded into the upper surface of the member 54. In this embodiment, it is anticipated that the bottom plate will be removably but fixedly attached. It will be appreciated that this form of embodiment is intended for a trimmer which rotates clockwise. By interchanging the plates 52 and 53 and inverting the head, it becomes suitable for an anticlockwise trimmer.

Referring to FIG. 3, it will be seen that the upper plate 52 can be rotatably mounted in such a way as to ride on a ball bearing 62 spring biased by a spring 63 from within a cylindrical aperture in the member 54.

It is also possible for the lower plate 53 to be slotted and rotatably attached as by bolts and arcuate slots, as is the upper plate 52 to make a reversible arrangement. In the alternative, the upper plate need not be provided at all and it has been found in that case that, in use, the cutting elements are retained and do not become detached.

With particular reference to FIG. 2, it will be seen that a substantial pivoting angle is possible for the cutting elements, in particular, of more than 90° and in this example of about 250°. Of course, the channel 57 need not be continuous so that in the region of the apertures 50 there merely needs to be a channel portion which extends for a given circumferential distance on at least one side of the aperture 50 to allow for a desired amount of rotation, e.g. 45°, in at least one direction of rotation. With particular reference to FIG. 3, it is also to be noted from its right-hand side that, as seen in cross-section, the channel 57 is sufficiently deep vertically to allow for limited pivoting of the cutting element about a horizontal axis, e.g. by about 20° upwardly and 20° downwardly but it has been found that significant angular displacement in that dimension is not of major importance. Thus, the centering portion 14 of the cutting element cooperates with the flanges 55 and 56 to hold the retaining portion 13 generally centrally within the gap between the flanges 55, 56 so as to engage both of the apertures 50 to provide pivotable support for the cutting element.

It will be seen so far that, in respect of a cutting element of the kind having a pivoted, enlarged, retaining portion, there is now provided a mounting arrangement in which the cutting element extends with a radial component of direction outwardly through a passage which has a circumferential extent sufficient to provide for substantial pivoting of the cutting element, e.g. through at least 45° in the direction opposite to the intended direction of rotation. By appropriate design, an adequate circumferential length of the channel or passage can be provided so that substantially greater angles of pivoting are easily possible. There is also provided, for a variety of different designs of cutting element, a relatively simple and easy to use replacement system in which an entrance zone is provided for introducing the element into the mounting portion and a rotatable and/or slidable member is provided which can be displaced to a position in which the entrance zone is at least partially impeded or closed, thus to prevent accidental removal of the cutting element.

Figure 4:
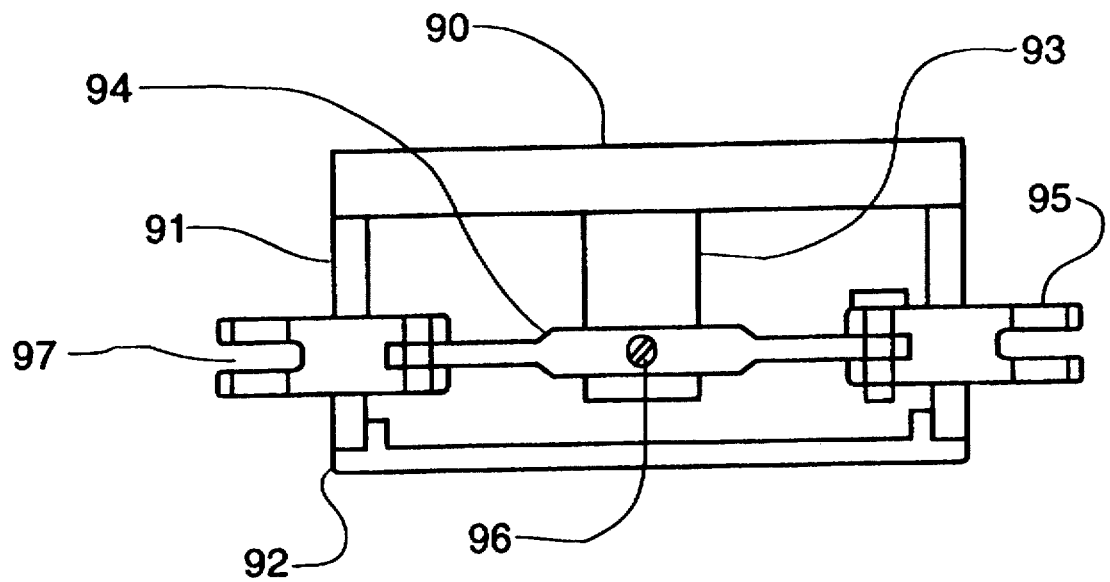
FIG. 4 is a view of a second embodiment, especially as an adaption to an existing rotary cutter.
Figure 5:
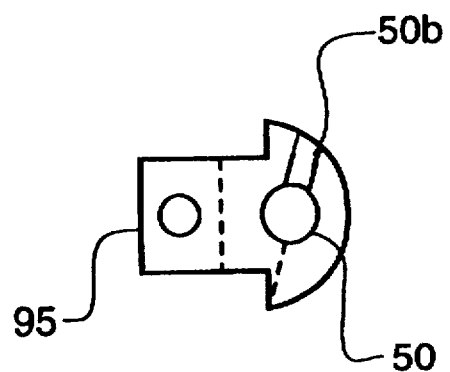
FIG. 5 is a plan view of a rotatable end member of the embodiment of FIG. 4.

FIGS. 4 and 5 shows a second embodiment based upon the principle of the preceding embodiment but designed as an adaption to an existing rotary cutter, which adaptation enables the cutter to employ cutting elements of the form shown on the right-hand side of FIG. 2. FIG. 4 illustrates the conventional housing of the cutter head, including a fan 90, plastic cylindrical wall 91, enclosure member 92 and motor drive shaft 93.

The device for modifying this conventional form of rotary cutter comprises three parts including a supporting body 94 and two end members 95. The main body 94 is centrally apertured to be inserted over the shaft and has a set screw or bolt 96 to enable it to be secured in place. It would be manufactured with a variety of lengths to suit a variety of diameters of rotary cutter head. Attached to the ends of this member are the end members 95 which project through circular apertures in the cylindrical wall 91. These circular apertures will be specifically drilled for this purpose. The free end regions of these end members are slotted to provide channels 97, the flanges or portions on either side of the channel corresponding to the flange or wall portions of the embodiment of FIGS. 1 to 3. In this example and as shown in FIG. 5, the upper portion is apertured in a manner similar to that of FIG. 2. The lower member or portion can be similarly formed or may simply have a circular recess in it in which the retaining portion 13 of the cutting element can sit. As with the embodiment of FIGS. 1 to 3, the centering portion 14 of the cutting element (not shown in FIGS. 4 and 5) serves to maintain engagement between the spherical retaining portion 13 and the apertures 50 in the flanges on each side of the channel 97.

Figure 6:
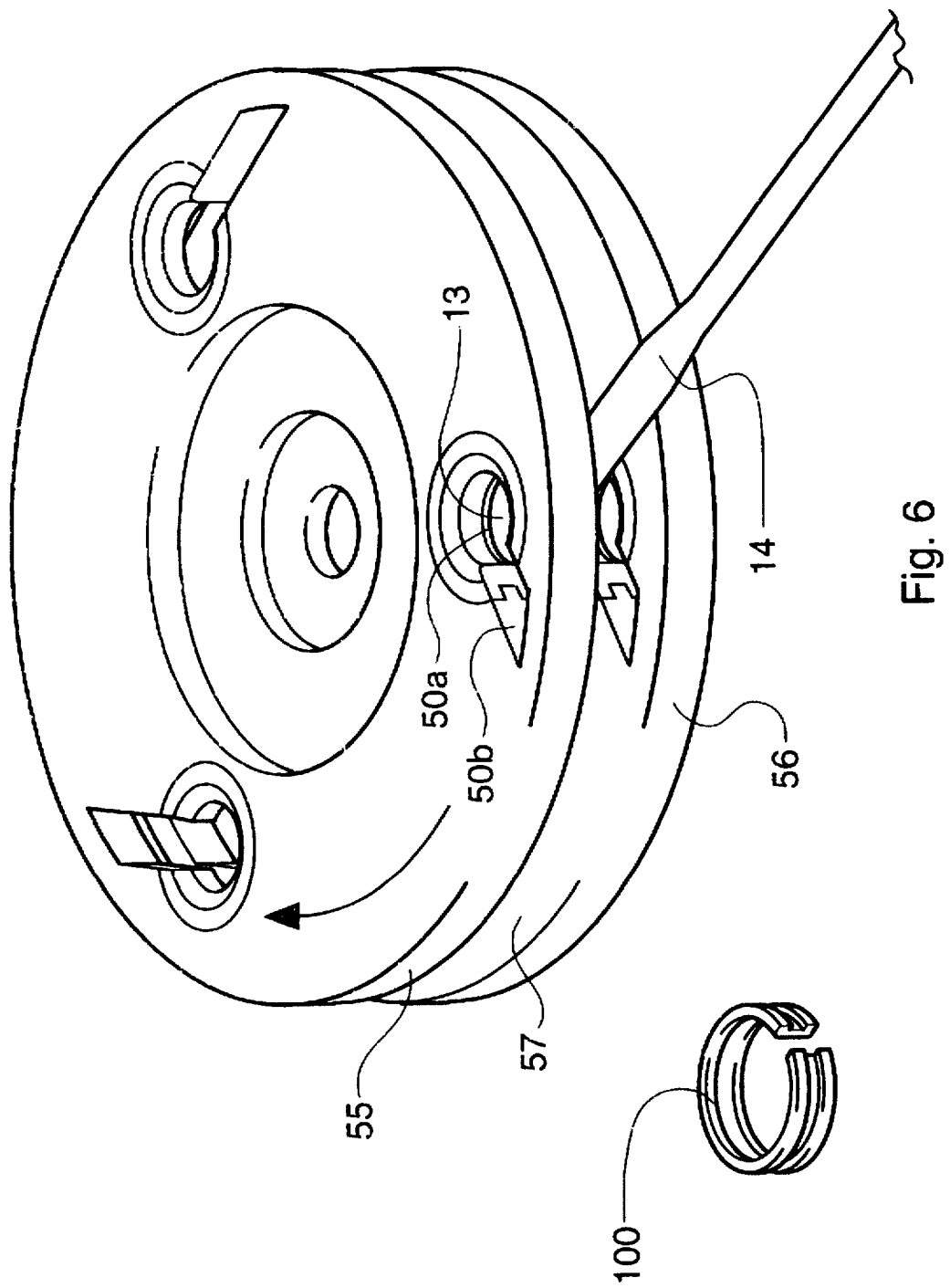
FIGS. 6, 7 and 8 show perspective views of a further embodiment.
Figure 7:
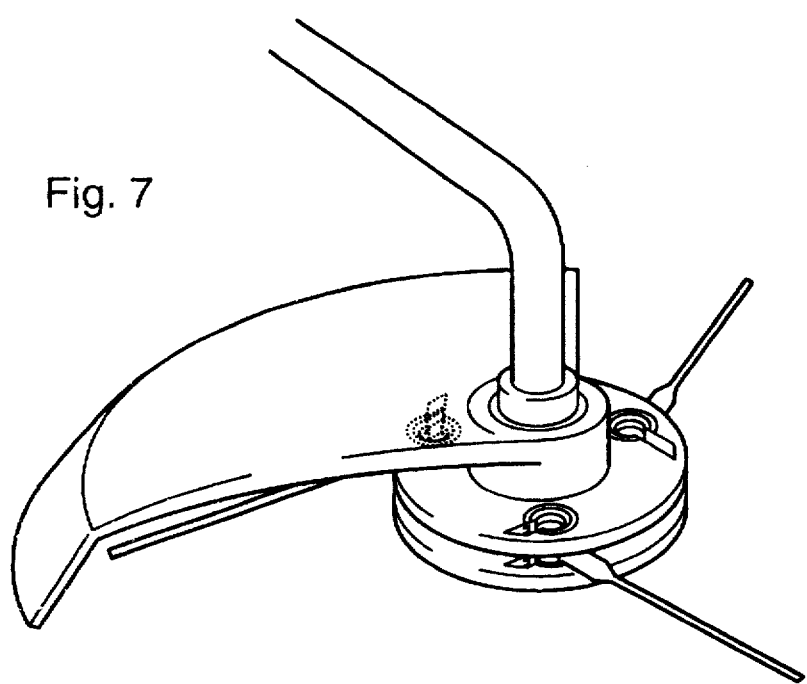
Figure 8:
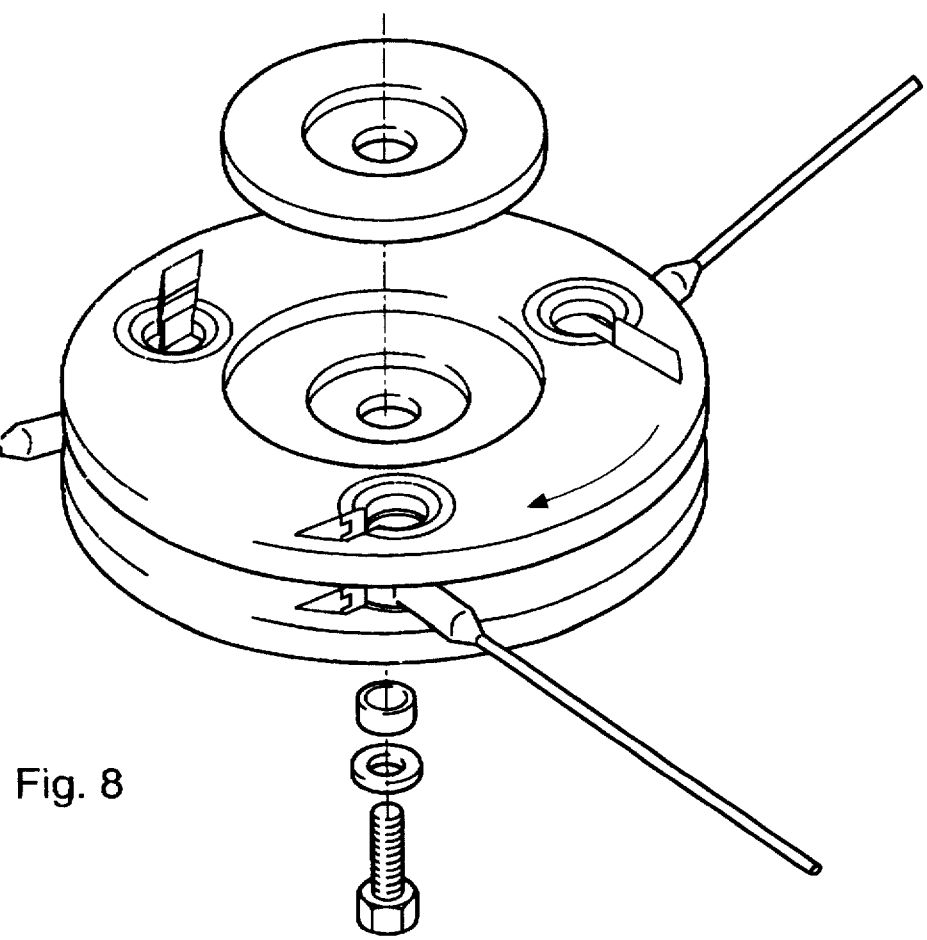

A third, preferred embodiment of the present invention is shown in FIGS. 6, 7 and 8 and which is a removable head which has first and second flanges 55, 56, as in FIG. 1. The head is rotatable in use about a first axis A, while the cutting elements are pivotable about a second axis B over an angle of 120° in both directions from a radial position. However, the end plates 52 and 53 are not provided and the extensions 50b do not extend to the periphery of the respective flanges. If this head is, say, of a plastics material the apertures 50a may contain annular inserts 100. Such inserts are preferably of hardened steel and prevent the cutting element wearing the cutter head. However, these inserts are not essential, particularly if the head is of a sufficiently wear resistant material, and the spherical bearing portions 13 of the cutting elements may bear directly on the material of the flanges.

In this embodiment, the cutting elements are inserted tip first into the apertures 50a and then threaded radially outwardly until the retaining portion of the element locates between the flanges.

In more detail, each aperture 50 comprises a circular portion 50a and an extension 50b. The extension 50b is oriented so that it lies perpendicular to a radial line (from the first axis) which passes through the circular portion 50a. As in the preceding embodiments, the spherical retaining portion 14 of the cutting element is pivotably supported by the circular portions 50a of the flanges 55, 56, which circular portions thus constitute retaining means for the cutting element. Although the aperture 50 in the second flange 56 is shown as having an extension 50b, this extension is not necessarily provided in both flanges. Instead, the aperture 50 in the second flange could merely comprise the circular portion 50a.

The cylindrical centering portion 14 extends between the flanges 55, 56 to emerge from the channel 57, and meets the filamentary cutting portion 12 externally of the head. The centering portion 14 has a diameter slightly smaller than the width of the channel 57 so that, in use, the centering portion 14 holds the cutting element generally centrally between the flanges 55, 56 so that the spherical retaining portion 13 makes proper bearing contact with the periphery of each aperture 50. This enables cutting elements with different profiles of cutting portion 12 to be used with the same head without adaptation of the head, provided that all of the different forms of cutting element have substantially the same dimensions with regard to the spherical bearing portion 13 and the centering portion 14.

The diameter of the spherical retaining portion 13 is slightly smaller than the diameter of the circular portion 50a of the aperture 50, and is larger than the width of the extension 50b. The diameter of the centering portion 14 is slightly smaller than the width of the extension 50b. The cross-section of the filamentary cutting portion 12 is smaller than that of the centering portion 14. With these dimensions, the spherical retaining portion 13 is prevented from passing between the flanges 55, 56 and so is held firmly yet pivotably, in use, by the retaining means constituted by the apertures 50, and is centered between the flanges 55, 56 by the cooperation between the centering portion 14 and the flanges themselves.

To install each cutting element, the free end of the cutting portion 12 is inserted into the aperture 50 to engage at the periphery of the head between the flanges 55, 56. The cutting element is generally aligned with the extension 50b so that, as the cutting element is pulled inwardly of the aperture 50, the centering portion 14 partially enters the extension 50b, while the cutting element flexes. When the spherical retaining portion 13 reaches the circular portion 50a of the aperture 50, it passes into the channel 57 between the flanges 55, 56, where it is retained by the centering portion 14. To remove the cutting element, it is moved into general alignment with the extension 50b, and the spherical retaining portion 13 is then pushed through the circular portion 50a of the aperture, for example by means of the free end of another cutting element inserted through the aperture 50 in the second flange 56. The retaining portion 13 can then be grasped manually and the cutting element can be withdrawn.

I claim:

1. A rotary cutter head assembly comprising a cutter head for rotation about a first axis, and a cutting element which is carried by the cutter head for pivoting movement relative to the cutter head about a second axis which is parallel to and spaced from the first axis, the cutter head comprising first and second flanges which are spaced apart from each other to define a peripheral channel, the first and second flanges being provided with retaining means for the cutting element, and the cutting element comprising a spherical retaining portion having a first diameter which is larger than the spacing between the flanges, which retaining portion is engaged between the flanges by the retaining means, a cylindrical centering portion having a second diameter which is smaller than the first diameter, and a filamentary flexible elongate cutting portion which has a cross-section smaller than that of the centering portion, the retaining means of the first flange comprising an aperture which is sized to permit the passage therethrough of the spherical retaining portion, the aperture having an elongate extension having a width which is smaller than the first diameter and larger than the second diameter, whereby the cutting element is connectable to the head by passing the cutting element through the aperture to emerge from the channel, allowing the centering portion to pass into the channel through the elongate extension of the aperture, and allowing the spherical retaining portion to pass through the aperture into the channel, there to be retained by the aperture and by the retaining means of the second flange, the centering portion cooperating with the flanges to hold the spherical retaining portion in engagement with the aperture and with the retaining means on the second flange.

2. An assembly as claimed in claim 1, wherein the cutting element is pivotable relatively to the cutter head through an angle of at least 80° about the second axis.

3. An assembly as claimed in claim 1, wherein the cutting element is pivotable relatively to the cutter head through an angle of at least 120° about the second axis.

4. An assembly as claimed in claim 1, wherein the elongate extension extends from the aperture in a direction which is substantially perpendicular to a radial line passing through the aperture.

5. An assembly as claimed in claim 1, wherein the elongate extension extends from the first aperture portion to the periphery of the first flange.

6. An assembly as claimed in claim 1, wherein the elongate extension terminates short of the periphery of the first flange.

7. An assembly as claimed in claim 1, wherein the aperture in the first flange comprises a first aperture and retaining means of the second flange comprises a second aperture situated opposite and corresponding to the first aperture.

8. An assembly as claimed in claim 7, wherein the second aperture has an elongate extension situated opposite and corresponding to the elongate extension of the first aperture.

9. An assembly as claimed in claim 1, wherein the cutting element comprises a one-piece moulding of plastics material.

10. An assembly as claimed in claim 1, wherein the cutting element is one of a plurality of similar said cutting elements distributed around the first axis, each cutting element being retained with respect to the head by respective said retaining means.

11. An assembly as claimed in claim 1, wherein the cutting element is pivotable about the second axis through an angle greater than 10°.

12. An assembly as claimed in claim 11, wherein the cutting element is pivotable about the second axis through an angle greater than 80°.

13. An assembly as claimed in claim 11, wherein the cutting element is pivotable about the second axis through an angle of 120°.

* * * * *